United States Patent [19]
Kasuya et al.

[11] Patent Number: 5,931,275
[45] Date of Patent: Aug. 3, 1999

[54] STATIONARY CYLINDER TYPE CLUTCH DEVICE

[75] Inventors: Satoru Kasuya; Nobutada Sugiura, both of Aichi-ken, Japan

[73] Assignee: Aisin AW Co., Ltd., Anjo, Japan

[21] Appl. No.: 08/949,756

[22] Filed: Oct. 14, 1997

[30] Foreign Application Priority Data

Oct. 14, 1996 [JP] Japan .................................. H8-289003

[51] Int. Cl.⁶ .................................................. F16D 25/08
[52] U.S. Cl. .................................. 192/85 CA; 192/109 R
[58] Field of Search .......................... 192/85 CA, 70.28, 192/109 R, 52.4, 109 A, 109 F; 475/116, 146, 316

[56] References Cited

U.S. PATENT DOCUMENTS

| | | | |
|---|---|---|---|
| 3,038,575 | 6/1962 | Hansen . | |
| 3,706,365 | 12/1972 | Bohm et al. | 192/85 CA |
| 5,234,090 | 8/1993 | Haka | 192/85 CA X |
| 5,735,376 | 4/1998 | Moroto et al. | 192/85 CA |

FOREIGN PATENT DOCUMENTS

| | | |
|---|---|---|
| A-2-248721 | 10/1990 | Japan . |
| A-6-241287 | 8/1994 | Japan . |
| A-7-119761 | 5/1995 | Japan . |

*Primary Examiner*—Richard M. Lorence
*Attorney, Agent, or Firm*—Oliff & Berridge, PLC

[57] ABSTRACT

To reduce dispersion in an engagement stroke amount caused by error in manufacturing parts and to reduce the stroke amount in a stationary cylinder type clutch device, the clutch device includes a hub, a drum, friction coupling elements connecting thereto such that rotational power can be transmitted, a pressing member and a reaction force member arranged at opposite ends of the clutch device in the axial direction, and a hydraulic servo for engaging and disengaging the friction coupling elements where the hydraulic servo is installed to a fixed member, a servo force is transmitted to the friction coupling elements via the pressing member and the reaction force caused by the engagement is supported by the fixed member via the reaction force member. A return spring, for retracting a piston of the hydraulic servo, is installed between the pressing member and the reaction force member whereby the piston is retracted via the pressing member and the amount of retraction is restricted to a predetermined value by a regulating element.

18 Claims, 6 Drawing Sheets

|   | C-1 | C-2 | B-1 | B-2 | B-3 | B-R |
|---|-----|-----|-----|-----|-----|-----|
| P |     |     |     |     |     |     |
| REV | O |   |     |     |     | O |
| N |     |     |     |     |     |     |
| 1ST | O |   |     |     | O |   |
| 2ND |   | O |   |     | O |   |
| 3RD | O | O |   |     |     |   |
| 4TH |   | O | O |     |     |   |
| 5TH |   | O |   | O |     |   |

STATIONARY CYLINDER TYPE CLUTCH DEVICE

BACKGROUND OF THE INVENTION

1. Field of the Invention

The invention relates to a clutch device, particularly to a stationary cylinder type clutch device where a hydraulic servo for operating a clutch device is installed at a fixed member by separating the hydraulic servo from a clutch drum integrated with a friction coupling element.

2. Description of Related Art

Conventionally, according to a multi-plate clutch for connecting a rotational member on the input side with a rotational member on the output side in a speed changing mechanism incorporated in a gear train of an automatic transmission for transmitting and cutting power, either ones of disks and plates of friction coupling elements alternately laminated in the axial direction among a plurality of friction disks by interposing separator plates, are supported unpivotably by an outer peripheral face of a hub by means of a spline coupling and the other ones are similarly unpivotably supported by an inner peripheral face of a drum by means of the spline coupling. According to a hydraulic servo for pressing such friction coupling elements, the hydraulic servo is installed to the clutch drum side fixed to one of the rotation members where a hydraulic chamber is demarcated by a cylinder integrated with a drum and a piston slidably arranged therein and where the piston is extracted by a hydraulic pressure supplied to the hydraulic chamber by which the friction coupling elements are pressed to the drum against a reaction force thereby engaging the clutch. That is, the hydraulic servo is of a rotational cylinder type rotating along with the clutch drum.

According to such a rotational cylinder type clutch, the control of the hydraulic servo becomes complicated since a centrifugal hydraulic pressure is generated by rotating the cylinder. Further, the hydraulic pressure must be supplied from a fixed member to the rotating cylinder for operating the hydraulic servo. Accordingly, the provision of sealing for preventing oil leakage from a relatively rotating portion in an oil supply passage is indispensable whereby an abrasive resistance caused by dragging the seal ring is caused and deterioration of a transmission efficiency by the amount of resistance is inevitable. Hence, there has been proposed a stationary cylinder type clutch capable of resolving the problem accompanied by the rotation of the hydraulic servo by separating the hydraulic servo from the clutch drum and installing it on the side of a fixed member, such as a casing. A technology is disclosed, as an example of such a clutch, in Japanese Laid-open Patent Publication No. JP-A-7-119761.

According to the prior art, friction coupling elements are connected to inner and outer peripheries of a hub and a drum structuring input and output members of a clutch, such that the rotational power can be transmitted, a pressing member and a reaction force member are arranged at both ends of the friction coupling elements in the axial direction to interpose the friction coupling elements, a hydraulic servo for engaging and disengaging the friction coupling elements is installed at a fixed member, a servo force of the hydraulic servo is transmitted to the friction coupling elements via the pressing member and a reaction force caused by the engagement of the friction coupling elements is supported by the fixed member via the reaction force member. Further, a return spring, for pushing back a piston of the hydraulic servo for releasing the clutch, is arranged between a casing of a speed changing mechanism forming a cylinder of the hydraulic servo and the piston by following an arrangement similar to that where a return spring is normally arranged between a cylinder and a piston of a hydraulic servo in a rotational cylinder type clutch.

In the meantime, according to the structure where the return spring of the hydraulic servo is arranged between the casing of a speed changing mechanism and the piston as in the above-described prior art, in releasing the clutch, the piston is forcibly retracted to a rearmost end portion of the cylinder by the pushing force of the return spring. In this case, loss of the stroke amount of the piston in moving the piston in a clutch engagement direction, that is, an amount of the stroke whereby the piston reaches a substantial engagement start position of the clutch nullifying clearances among the friction coupling elements by filling the cylinder with oil, is an amount of indispensable clearances for substantially eliminating dragging of the friction coupling elements in releasing the clutch, added with an amount of play that is set in consideration of thermal expansion and the like among the piston, the pressing member, the friction coupling elements, the reaction member and the casing. Thereby, a dispersion among individual products with respect to loss of the stroke amount is increased, since the number of interposed members is more than those of a rotational cylinder type clutch. Accordingly, when the piston is retracted to the rearmost end position as in the prior art, even if the control of the hydraulic pressure for engagement of the clutch is carried out finely and with small error among individual products, the engagement characteristics of the respective products differ by the dispersion in the loss of the stroke amount and, as a result, the controllability deteriorates. Furthermore, a large amount of the piston stroke is always required by retracting the piston to the rearmost position whereby the period of time required for the engagement is prolonged.

SUMMARY OF THE INVENTION

Hence, it is a first object of the invention to provide a stationary cylinder type clutch device capable of reducing a dispersion in the stroke amount due to production error and reducing the stroke amount per se.

It is a second object of the invention to reduce a dispersion in the stroke amount of respective products by reducing to as small as possible the number of members causing accumulated error.

Further, even if the dispersion in the stroke amount is reduced by reducing the accumulated error, the effect is diminished if flotation of a piston before operation is caused. Therefore, it is a third object of the invention to eliminate the flotation of a piston with respect to the friction coupling elements.

It is a fourth object of the invention to structure regulating means for reducing the dispersion in the stroke amount by minimizing an increase in the number of parts.

Furthermore, it is a fifth object of the invention to structure compactly a hydraulic servo by fabricating loading means for preventing flotation of the piston which does not need considerable space for arranging the means.

Furthermore, it is a sixth object of the invention to structure a hydraulic servo further compactly by fabricating loading means for preventing floating of the piston which does not need a new member.

In order to achieve the first object, according to the invention, there is provided a stationary cylinder type clutch device including a hub and a drum respectively providing an input member and an output member, a friction coupling element connected to an outer periphery of the hub and an inner periphery of the drum and capable of transmitting a rotational power, a pressing member and a reaction force member arranged at both ends of the friction coupling element in an axial direction to interpose the friction coupling element and a hydraulic servo engaging and disengaging the friction coupling element, wherein the hydraulic servo is installed at a fixed member, a servo force of the hydraulic servo is transmitted to the friction coupling element via the pressing member and a reaction force caused by engaging the friction coupling element as supported by the fixed member via the reaction force member, a return spring arranged between the pressing member and the reaction force member for pushing the pressing member and the reaction force member in a direction for separating the pressing member and the reaction force member, and a regulating means for restricting an amount of separation between the pressing member and the reaction force member to a predetermined value.

In order to achieve the second object, the regulating means is structured by a stopper for regulating an amount of expansion of the return spring.

In order to achieve the third object, the hydraulic servo is structured by a piston for applying the servo force on the pressing member and loading means for preventing the piston from floating from the pressing member by always pushing the piston to the pressing member.

In order to achieve the fourth object, the return spring is arranged at a radially inner side of the hub and engages a retainer mounted to the pressing member at one end thereof and the stopper is a snap ring fixed to the inner peripheral side of the hub for engagement with the retainer.

In order to achieve the fifth object, the loading means is structured by a belleville spring having an applied load smaller than that of the return spring, which is arranged inside of the hydraulic servo.

In order to achieve the sixth object, the loading means is structured by applying the hydraulic pressure supplied into the hydraulic servo such that the servo force having an applied load smaller than that of the return spring is produced.

According to the first aspect of the invention, in bringing the clutch from an engaged state to a released state, the amount of retraction of the piston, by pushing the return spring, is restricted to a constant amount that is regulated by the regulating means, so that the piston is not retracted by a constant amount or more so far as an external force is not applied thereon. Accordingly, dispersion in a stroke amount in engagement is determined by an error of comparatively few members without including that of the casing and therefore, the dispersion can be reduced and deterioration of the controllability can be prevented. Further, in setting the stroke amount, allowance of accumulated error, that is for elimination of dragging, etc., of a number of members is not needed and, therefore, a constant amount can be set based on clearances needed in releasing the friction coupling element whereby the stroke amount can be reduced to a minimum value needed in releasing the clutch and an engagement time period can be shortened.

According to the second aspect of the invention, the set amount of retraction of the piston is determined by the restricted amount of the stroke of the return spring per se for pushing back the piston and, therefore, the number of members structuring elements accumulating error can be reduced to a minimum by excluding interposition of intermediary movable members whereby the dispersion among respective products can be further reduced.

Moreover, even in the case where the above-described structure is adopted, when a vibrating load is operated or a thrust load is operated on the piston in relation to a mechanism to be integrated in releasing the clutch, the piston may be retracted by an amount more than the stroke restriction amount by draining oil in the cylinder from an oil supply passage. In that case, the stroke amount for retracting the piston is increased, which causes an increase in the dispersion or the loss of the stroke amount. Hence, according to the third aspect of the invention, loading means exerting a load sufficiently smaller than the load of the return spring, is arranged between the casing and the piston such that the piston is pressed in the direction of engaging the clutch whereby the piston can be prevented from floating from a predetermined position without influencing the amount of retraction of the piston by the return spring. As a result, the stroke amount of the piston in engaging the clutch can be maintained constant.

According to the fourth aspect of the invention, the regulating means can be structured only by using a retainer that is an existing structuring member in the clutch and adding a snap ring to the hub whereby an increase in a number of parts accompanied by providing the regulating means can be minimized.

According to the fifth aspect of the invention, by structuring the loading means by a belleville spring, the loading means requires little installation space and can be arranged in a cylinder where the dimension in the axial direction is restricted whereby the hydraulic servo can be even more compactly structured.

According to the sixth aspect of the invention, the loading means is structured by supplying a hydraulic pressure to the hydraulic servo, arrangement of a new member for preventing flotation of the piston is not needed whereby the hydraulic servo can be even more compactly structured.

BRIEF DESCRIPTION OF THE DRAWINGS

The invention will be described with reference to the figures in which.

DETAILED DESCRIPTION OF PREFERRED EMBODIMENTS

An explanation will be given of embodiments of the invention with reference to the drawings as follows. Explaining firstly an outline structure, as shown by a sectional view of FIG. 1 (incidentally, only end faces are shown with respect to members each having a sectional shape that is symmetrical around a center axis C), the clutch device is a stationary cylinder type clutch including a hub 53 and a drum 54 structuring input and output members, friction coupling elements 50 with a first set of elements connected to an outer periphery of the hub 53 and a second set of elements connected to an inner periphery of the drum 54 such that rotational power can be transmitted from the hub 53 to the drum 54, a pressing member 33 and a reaction force member 56 flanking the friction coupling elements 50 by being arranged at both ends thereof in the axial direction and a hydraulic servo 3 for engaging and disengaging the friction coupling elements 50 in which the hydraulic servo 3 is installed to a fixed member 10, the servo force of the hydraulic servo 3 is transmitted to the friction coupling elements 50 via the pressing member 33 and a reaction force caused by engagement of the friction coupling elements 50 is supported by the fixed member 10 via the reaction force member 56.

Figure 1:
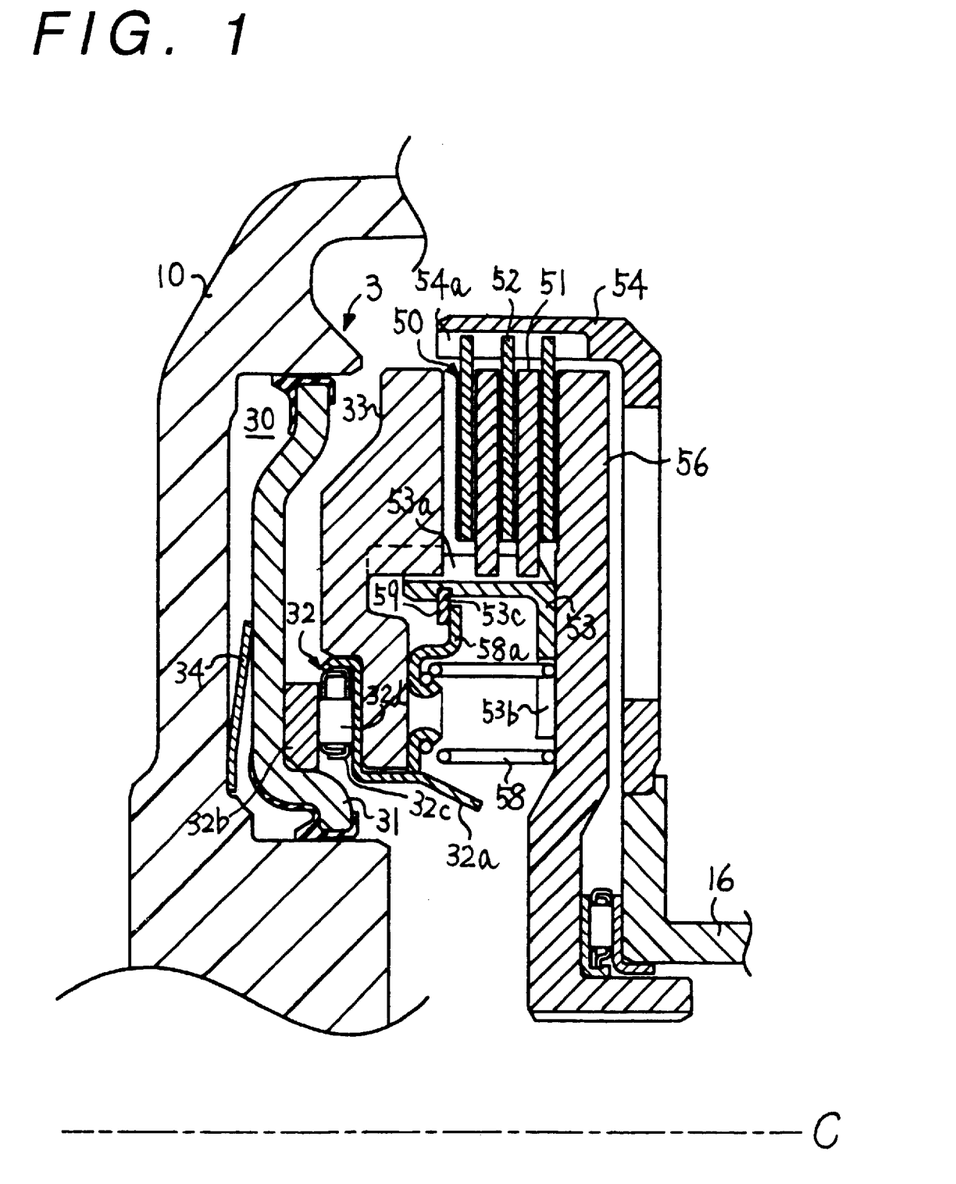
FIG. 1 is a sectional view showing a stationary cylinder type clutch device according to an embodiment of the invention in a state where the clutch is released.

Further, return springs 58 are arranged between the pressing member 33 and the reaction force member 56 for pushing the two members apart. Also, regulating means 59 for restricting the amount of separation between the pressing member 33 and the reaction force member 56, resulting from the pushing operation of the return springs 58, to a predetermined amount is installed on the hub 53.

According to the embodiment, the hub 53 is provided with a cylindrical flange portion having an outer peripheral spline 53*a* that connects with a first set of friction coupling elements 50 such that power can be transmitted and a radial flange portion which is joined to the reaction force member 56 by, for example, welding and where spring fitting holes 53*b* having a chipped circular shape are arranged uniformly in the circumferential direction, at an inner diameter side thereof (inner being defined as radially inward that is, toward axis C). The drum 54 is provided with a cylindrical flange portion having an inner peripheral spline 54*a* that connects with a second set of friction coupling elements 50 such that power can be transmitted and a radial flange portion which is connected to a radial flange of a pertinent output member 16 by, for example, welding.

The first set of friction coupling elements 50 comprise a plurality of friction disks 52, each pasted with side facings, and the second set of friction coupling elements 50 comprise a plurality of separator plates 51 which are interposed between the friction disks 52. The respective separator plates 51 are supported in the radial direction by the hub 53 by engaging a spline formed on the inner peripheral sides of each separator plate 51 with the outer peripheral spline 53*a* of the hub 53 such that the respective separator plates 51 can be moved in the axial direction. The respective friction disks 52 are supported in the radial direction by the drum 54 by engaging a spline formed on outer peripheral sides of each friction disk 52 with the inner peripheral spline 54*a* of the drum 54 such that the friction disks 52 can be moved in the axial direction.

The pressing member 33 is made to have a ring-like shape using a thick plate having a bent section which is advantageous in maintaining rigidity where the inner side in the radial direction opposite the hydraulic servo 3 is offset in a direction toward the reaction force member 56, the outer side in the radial direction, opposing the friction coupling elements 50, is also offset in the direction towards the reaction force member 56 and the central portion in the radial direction is projected in a direction toward the hydraulic servo 3, resulting in a roughly block "C" shape in cross section. Further, an inner peripheral spline having a shape the same as those of the separator plates 51 is formed in the inner peripheral wall face of the upper arm of the recess of the block "C" shape that is formed and the pressing member 33 is supported in a nonrotatable state and movable in the axial direction , with respect to the reaction force member 56, by engaging the inner peripheral spline with the spline 53*a*.

The reaction force member 56 is an annular plate member having a cross section in an L-like shape which is provided with a radial flange portion having a plate thickness similar to that of the friction member 33 and a cylindrical flange portion extending in the direction away from the pressing member 33. A spline is formed at the inner periphery of the cylindrical flange portion and is engageable with a pertinent input member.

The hydraulic servo 3 comprises an annular cylinder 30 that is formed in the fixed member 10 formed by a casing of a speed changing mechanism, a belleville spring 34 structuring loading means having a relatively small set load is arranged between the bottom portion of the wall of the cylinder 30 and the back face of an annular piston 31. The annular piston 31 is fitted to the cylinder 30. The piston 31 has a cross sectional shape where the inner diameter side and the outer side are respectively bent in a quasi-block "C" shape with the arms extending in a direction toward the pressing member 33 to provide and maintain rigidity.

Further, a thrust bearing 32 is provided to prevent transfer of the rotation of the pressing member 33 to the hydraulic servo 3 and the annular piston 31. The thrust bearing 32 comprises a cage 32*c* supporting a number of rollers 32*d* between a race 32*b* that is mounted in the vicinity of a bent corner portion on the inner radial side of the piston 31 and a race 32*a* that is mounted to the back face of the offset portion on the inner radial side of the pressing member 33. The rollers 32*d* are maintained at intervals in the circumferential direction. The race 32*b* is an annular plate member having a thick wall for maintaining rigidity which is centered by fitting to the bent portion at the inner side of the piston 31 in the radial direction. The race 32*a* is a thin plate race having a bent sectional shape which is positioned in the radial direction by contacting the outer periphery of the cage 32*c* and centered by pressing the inner periphery of a retainer 58*a*, mentioned later, and supported by the pressing member 33 by centering the race 32*a* by fitting it to the back face of the offset portion of the pressing member 33.

One end of each of the return springs 58, each comprising a cylindrical coil spring arranged uniformly in the circumferential direction, is brought into contact with the pressing member 33 via a spring retainer 58*a*. The spring retainer 58*a* positions end portions of the respective return springs 58 at predetermined intervals in the circumferential direction by supporting one end of each of the return springs 58 by calking. The other end of each spring 58 is fitted to a spring fitting hole 53*b* in the chipped circular shape of the hub 53. The hub 53 acts as a spring retainer because of the spring holes, really notches, 53*b* in the inner peripheral surface of the hub 53 forming the chipped circular shape. The spring holes 53*b* are uniformly arranged in the circumferential direction of the hub 53. Therefore, both ends of each of the return springs 58 are supported. One end is supported by the spring retainer 58*a* of the pressing member 33 and the other end is supported by the hub 53. Further, the outer peripheral edge of the spring retainer 58*a* is extended outwardly in the radial direction to the vicinity of the inner peripheral face of the axial flange portion of the hub 53.

According to the embodiment, as the regulating means for restricting the retracting stroke of the return springs 58, the regulating means, a snap ring, 59 serves as a stopper and is fitted into a circumferential groove 53c formed at the inner periphery of the axial flange portion of the hub 53 for restricting an amount of movement of the spring retainer 58a, and the pressing number 33, in the direction toward the piston 31, that is, for stopping the retracting stroke of the return springs 58 by bringing the outer peripheral edge of the spring retainer 58a into contact with the snap ring 59.

According to the clutch device structured as described above, in a clutch releasing state where the hydraulic pressure is not supplied to the hydraulic servo 3, the pressing face of the pressing member 33, for pressing the friction coupling elements 50, is kept in a state where it cannot be moved in the direction toward the reaction force member 56 by the pushing force of the return springs 58. Further, the piston 31 of the hydraulic servo 3 is pressed to the pressing member 33 via the bearing 32 by an extremely weak elastic load exerted by the belleville spring 34 whereby a state of no play is kept between the piston 31, the bearing 32 and the pressing member 33. Further, such a relative positional relationship is maintained in a range which does not exceed the stroke of the belleville spring 34 even if there is play among the members between the reaction force member 56 and the fixed member 10 and further even if the reaction force member 56 is moved from the casing 10 by the operation of a thrust force. That is, the clearance of the clutch is maintained constant irrespective of the position of the reaction force member 56 with respect to the fixing member 10.

Incidentally, the applied load of the belleville spring 34 is set in a state where a compressive displacement amount of the spring is smaller than the applied load of the return springs 58 so that the spring retainers 58a are brought into contact with the snap ring 59 as a stopper and there is no play is between the piston 31, the bearing 32 and the pressing member 33. Accordingly, the pressing member 33 is not moved in the direction toward the reaction force member 56 by the applied load of the belleville spring 34.

When hydraulic pressure (path not shown) is supplied into the cylinder 30 of the hydraulic servo 3 for the clutch engagement state, the piston 31 exerts the servo force by the hydraulic pressure exceeding the pushing force of the return springs 58 and moves the pressing member 33 in the direction toward the friction coupling elements 50 while compressing the return springs 58. According to the movement, because the system has the positional relationship of no play, as described above, there is no loss of stroke that would result from filling the play between the pressing member 33 and the piston 31 and between the reaction force member 56 and the fixed member 10, and the movement is by an amount which is substantially the stroke for engaging the pressing member 33 with the reaction force member 56.

Figure 2:
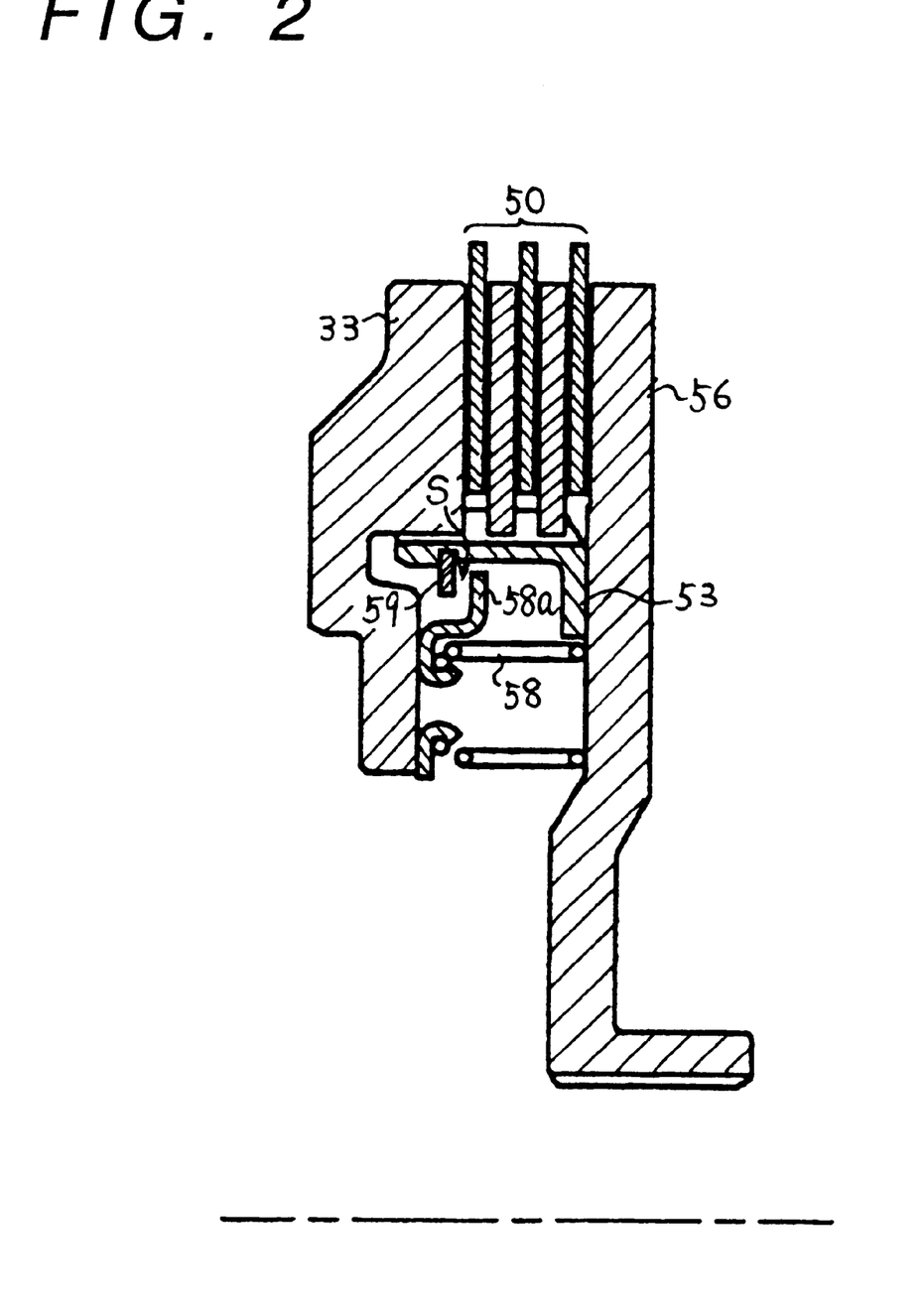
FIG. 2 is a-sectional view showing specifically friction coupling elements of the clutch device in a state where the clutch is engaged.

FIG. 2 shows a relative positional relationship among the respective members in engaging the clutch where a clearance S formed by an engagement stroke between the snap ring 59 fixed to the hub 53 and the retainers 58a, limits the restriction amount of the retracting stroke of the return springs 58. Further, the clearance S defines a clearance in releasing the clutch.

In this way, according to the embodiment, in bringing the state of engaging the clutch to the state of releasing thereof, the retracting amount of the piston 31 by the applied load of the return springs 58 is limited by the stroke restriction amount (designated by notation S in FIG. 2) of the return springs 58 that is regulated by the snap ring 59. Accordingly, the dispersion in the stroke amount in the START HERE engagement operation is determined by an interface distance accuracy between the pressing face of the reaction force member 56 with respect to the friction coupling elements 50 and the contact face of the snap ring 59 with respect to the spring retainer 58a, an interface distance accuracy between the pressing face of the pressing member 33 with respect to the friction coupling elements 50 and the contact face of the spring retainer 58a, and the shape accuracy of the spring retainer 58a. Thus, it is determined by errors in the accuracy of the comparatively few members and, therefore, the dispersion can be reduced regardless of differences in operational amounts of a specific product and those in different products whereby the deterioration of controllability can be prevented. Further, in setting the stroke amount, it is not necessary to provide for a large allowance of accumulated errors. Therefore, the stroke amount can be set based on clearances which are substantially necessary in releasing the friction coupling elements 50. As a result, the stroke amount can be reduced and the time period required for clutch engagement can be shortened. Furthermore, even when a vibrating load is operated in releasing the clutch, or a thrust load is operated on the piston 31 in relation to an integrated mechanism, the piston 31 is prevented from floating by the applied load exerted by the belleville spring 34.

Further, the only part that is added to the members existing in the known clutch, as a regulating means, are the snap ring 59 and the belleville spring 34. Therefore, an increase in a number of parts is minimized. Because the loading means is provided by the belleville spring 34, it can be arranged in the cylinder 30 where a dimension in the axial direction is restricted whereby the hydraulic servo 3 can be structured compactly.

Figure 6:
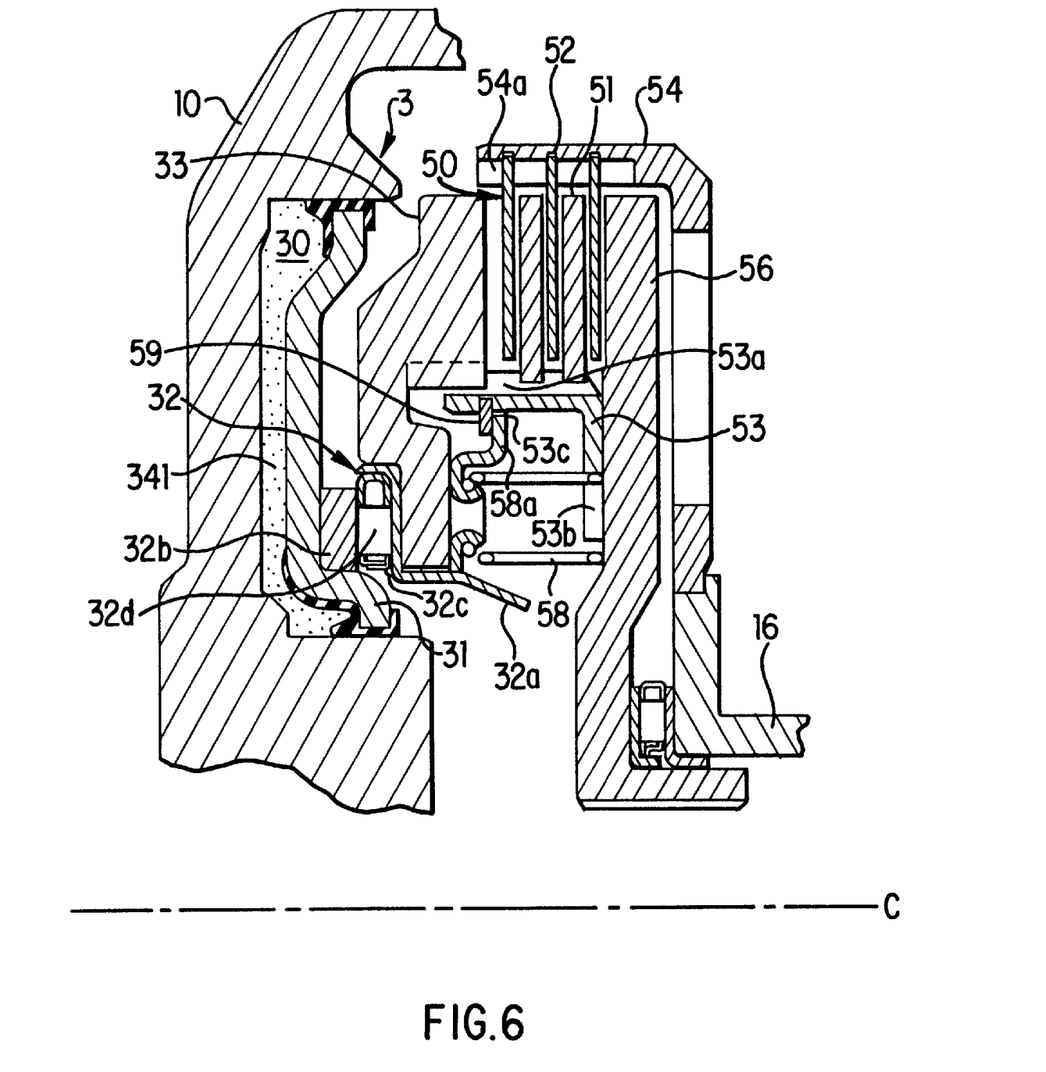
FIG. 6 is a sectional view showing a stationary cylinder type clutch device according to a second embodiment of the invention in a state where the clutch is released.

Incidentally, although according to the embodiment, the loading means is provided by the belleville spring 34 arranged inside of the hydraulic servo 3, an applied load equivalent to the applied load of the belleville spring 34 may be caused by supplying a slight hydraulic pressure 341 to the hydraulic servo 3 when in the clutch releasing state, as shown in FIG. 6, thereby replacing the belleville spring 34. Specifically, a hydraulic pressure 341 causing a servo force smaller than the applied load of the return springs 58 under a state where the spring retainers 58a are brought into contact with the snap ring 59 as a stopper, may be supplied. When the system is structured in this way, a new member is not necessary to provide a loading means and, therefore, the hydraulic servo 3 can be structured even more compactly.

Figure 3:
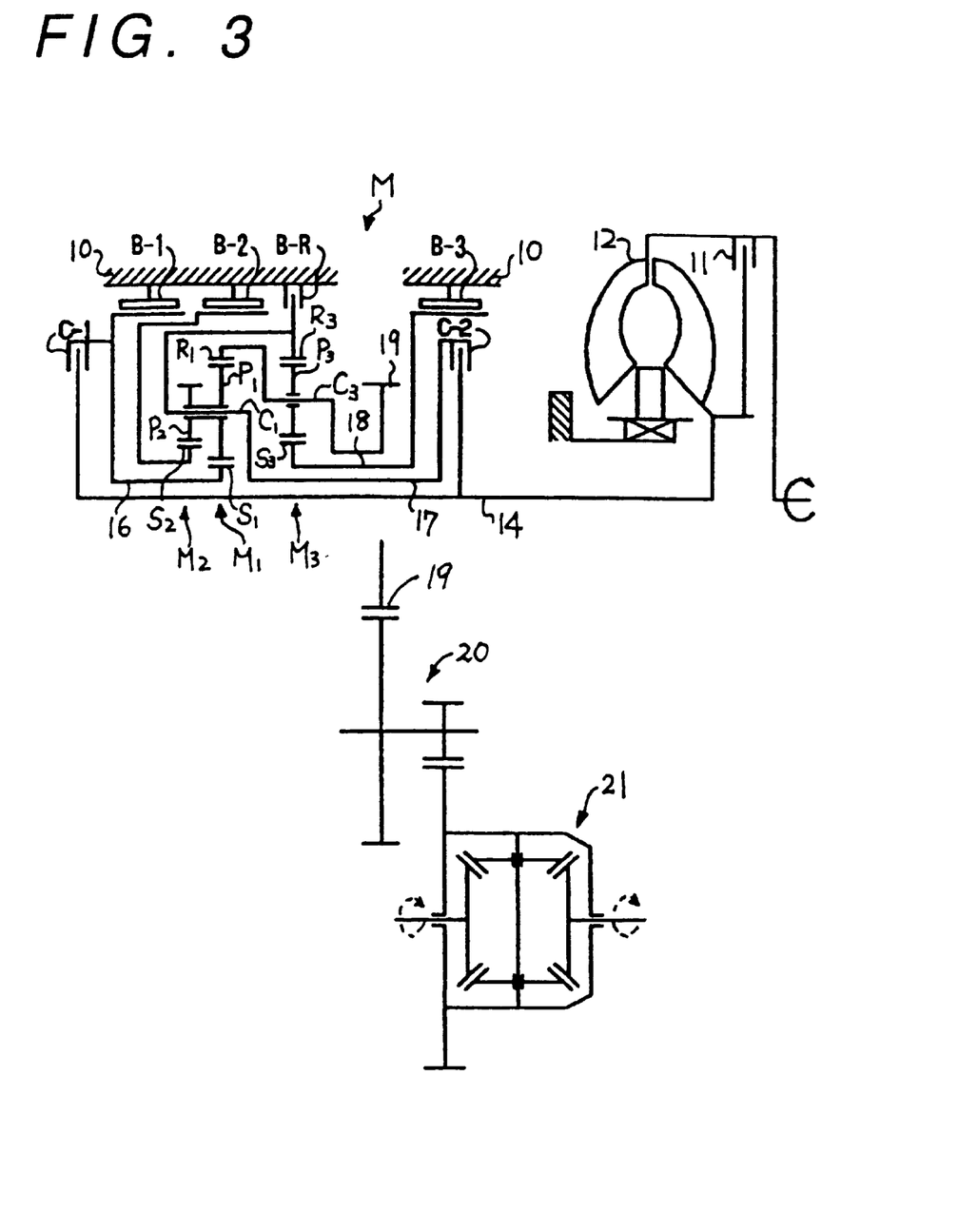
FIG. 3 is a schematic diagram showing the entire structure of a transaxle including an automatic transmission for a vehicle to which the clutch device is applied.

Although the clutch structured as described above is applicable to various devices, an explanation will be given of a specific example where the clutch is applied to a speed changing mechanism. FIG. 3 shows an example where the clutch is applied to an automatic transmission for achieving five (5) forward speeds and one (1) reverse speed by controlling three sets of planetary gear sets using two input clutches and four brakes. As schematically shown by FIG. 3, the device is a transaxle where a transversely mounted engine with automatic transmission for a front wheel drive vehicle and a differential gear are combined. The transaxle comprises a torque converter 12 with a lock-up clutch 11 connected to a crank shaft of an engine (not shown), an automatic transmission comprising a speed changing mechanism M for changing the output, a counter gear device 20 for transmitting the output, the speed of which is changed by the speed changing mechanism M by parallel axes, and a differential gear 21 for finally transmitting the transmitted output to left and right wheels of the vehicle.

The speed changing mechanism M of the automatic transmission has three planetary gear sets $M_1$, $M_2$, and $M_3$ and four brakes (B-1, B-2, B-3 and B-R) and connecting members therebetween. The speed changing mechanism M is provided with an input shaft 14 integrated to a turbine shaft of the torque converter 12 and extending and penetrating through the speed changing mechanism and is structured by arranging input clutches (C-1, C-2) respectively at both ends of the speed changing mechanism M and outputting power from an output gear 19 to the counter gear device 20, which structures a mechanism preferable for adopting the stationary cylinder type clutch structure where respective hydraulic servos for engaging and releasing the respective input clutches (C-1, C-2) are incorporated in the casing 10 of the speed changing mechanism.

Among the three planetary gear sets $M_1$, $M_2$ and $M_3$, the planetary gear sets $M_1$ and $M_3$ are respectively comprised of sun gears $S_1$ and $S_3$, ring gears $R_1$ and $R_3$, pinion gears $P_1$ and $P_3$ in mesh therewith and carriers $C_1$ and $C_3$ of the gears. The planetary gear set $M_2$ comprises a sun gear $S_2$, a pinion gear $P_2$ in mesh therewith and a carrier $C_1$. Further, respective ring gears $R_1$, $R_3$ and carriers $C_3$, $C_1$ of the gear sets $M_1$, $M_3$ are connected to each other, and the sun gear $S_1$ and the carrier $C_1$ of the gear set $M_1$ are connected to the input shaft 14 respectively via the clutches C-1, C-2 to provide input elements. In addition, the ring gear $R_1$ and the carrier $C_3$ which are connected to each other, are connected to the output gear 19. Further, the pinion gear $P_2$ of the gear set $M_2$ is connected to the pinion gear $P_1$, such that they can not be rotated relative to each other, and is rotatably supported by the common carrier $C_1$.

Furthermore, the sun gear $S_1$ of the gear set $M_1$ can be stopped by the casing 10 of the speed changing mechanism by the brake B-1, the sun gear $S_2$ of the gear set $M_2$ can be stopped by the casing 10 of the speed changing mechanism similarly by the brake B-2 and the ring gear $R_3$ connected to the carrier $C_1$ can be stopped by casing 10 of the speed changing mechanism by the brake B-R. The sun gear $S_1$ is connected to the clutch C-1 via a sun gear shaft 16 fitted to the outer periphery of the input shaft 14, the carrier $C_1$ is connected to the clutch C-2 via a carrier shaft 17 fitted to the outer periphery of the input shaft 14 and the sun gear $S_3$ is connected to the brake B-3 via a sun gear shaft 18 fitted to the outer periphery of the carrier shaft 17. The respective brakes, except the brake B-R, each has a band brake structure and the brake B-R has a multi-plate type structure.

According to the automatic transmission as described above, respective speed changing stages are achieved by engaging (designated by o mark in FIG. 4) and releasing (designated by no mark in FIG. 4) the respective clutches and brakes. That is, the first speed (1ST) is achieved by engaging the clutch C-1 and the brake B-3. In this case, the rotation of the input shaft 14 is inputted to the sun gear $S_1$ via the clutch C-1 and is outputted to the output gear 19 as rotation of the carrier $C_3$ that is mostly decelerated by stopping the sun gear $S_3$ by engaging the brake B-3. By contrast, the second speed (2ND) is achieved by engagement of the clutch C-2 and the brake B-3. In this case, an input inputted to the carrier shaft 17, via the clutch C-2, is inputted to the ring gear $R_3$ as it is via the carrier $C_1$ and is outputted to the output gear 19 as a differential rotation of the carrier $C_3$ with the sun gear $S_3$, that is stopped by the engagement of the brake B-3 as a reaction force element. The third speed (3RD) is achieved by the direct connection of the planetary gear set $M_1$ by engagement of both clutches C-1, and C-2. In this case, the rotation of the input shaft 14 is outputted to the output gear 19 as it is as the rotation of the carrier $C_3$.

Figure 4:
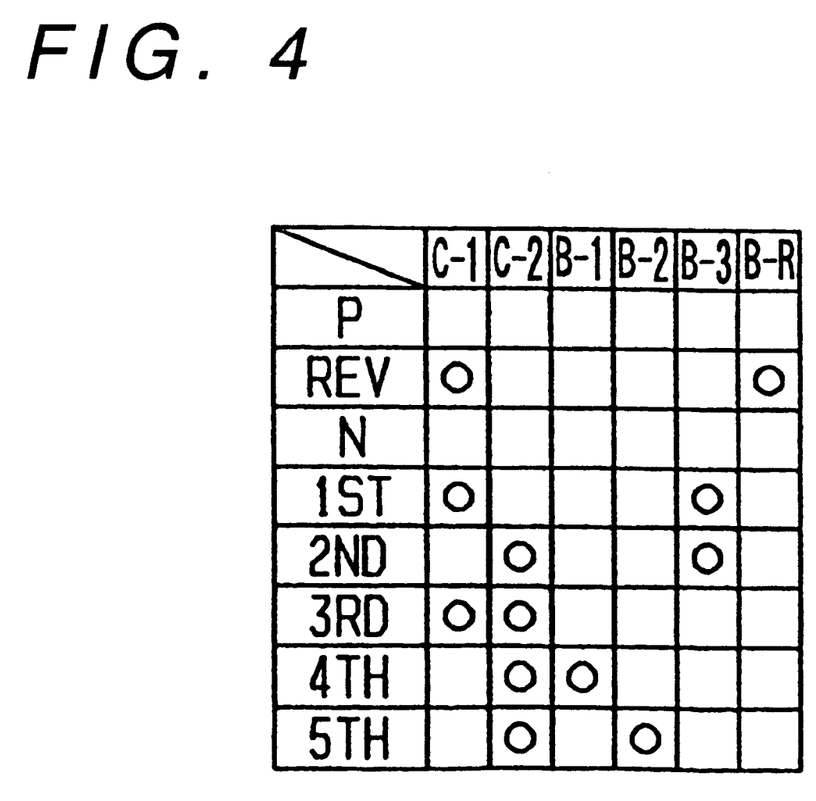
FIG. 4 is an operation table of the automatic transmission.

The fourth speed (4TH) is achieved by the engagement of the clutch C-2 and the brake B-1 for stopping the sun gear $S_1$. In this case, the rotation of the input shaft 14 is transmitted to the output gear 19 from the carrier $C_3$ as the rotation of the ring gear $R_1$ which is accelerated by rotation of the pinion gear $P_1$ with respect to the rotation of the carrier $C_1$. By contrast, the fifth speed is achieved by engagement of the clutch C-2 and the engagement of the brake B-2. In this case, the rotation of the input shaft 14 is transmitted to the output gear 19 from the carrier $C_3$ as rotation of the ring gear $R_1$ which is accelerated further by the rotation of the pinion gear $P_2$ having a small diameter, providing a reaction force to the sun gear $S_2$, and having a diameter larger than that in achieving the fourth speed.

Incidentally, the reverse speed (REV) is achieved by the engagement of the clutch C-1 and the brake B-R and, in this case, the rotation of the ring gear $R_1$ is reversed and decelerated by stopping of the carrier $C_1$ with respect to the input from the sun gear $S_1$, and is outputted from the output gear 19 via the carrier $C_3$.

Figure 5:
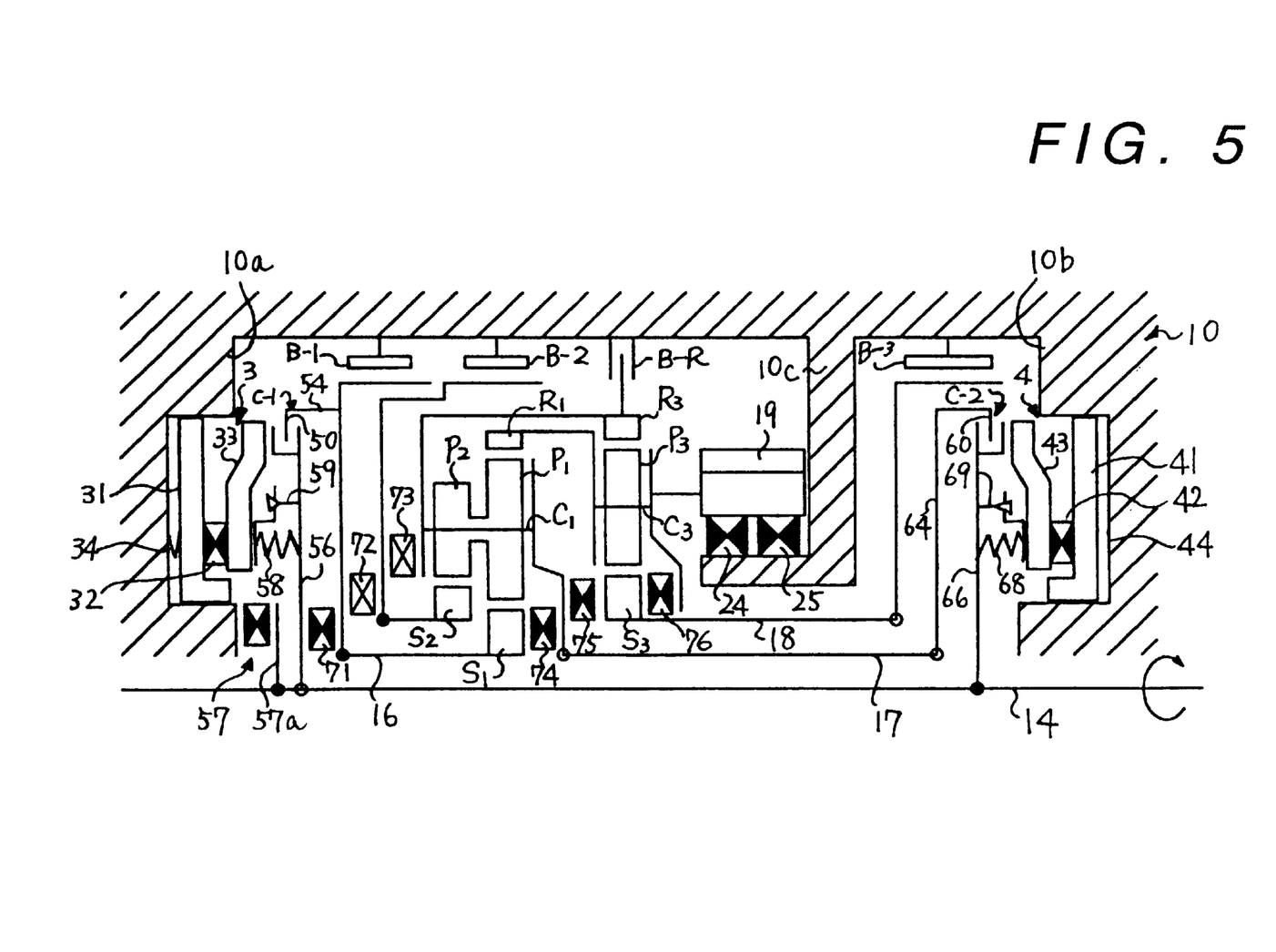
FIG. 5 is a schematic view showing a speed changing mechanism of the automatic transmission.

In respect of the speed changing mechanism, the invention is applied to the two input clutches C-1 and C-2. As shown by FIG. 5, respective hydraulic servos 3, 4 of the clutches are opposedly installed with both end walls 10a and 10b of the casing 10 of the speed changing mechanism as fixed members. A detailed description has been given of the specific structure of the clutches previously. Accordingly, with respect to the input clutch C-1, the same reference notations are attached to members corresponding to those described previously. With respect to the input clutch C-2, corresponding members are represented by reference notations where the numeral notations are increased by 10. The explanation thereof will be omitted and an explanation will be given only of connecting relationship between the two clutches and respective members and a reaction force support structure.

In this example, with respect to the side of the clutch C-1, the drum 54 also serves as a drum of the brake B-1 and is connected to the sun gear shaft 16 and the reaction force member 56 is connected to the input shaft 14, the input shaft 14 being movable in the axial direction. By contrast, the drum 64 on the side of the input clutch C-2 is connected to the carrier shaft 17 to be movable in the axial direction and the reaction force member 66 is fixed to the input shaft 14. Here, circle marks o showing the connections between members representing a connecting structure for transmitting a rotational force that is movable in the axial direction which comprises a spline coupling or the like and dot marks • represent a connecting structure that is unmovable in the axial direction, at least with respect to the direction in which an axial force is to be transmitted, such as a completely fixed structure or a structure where a snap ring is fitted to an end of a spline coupling portion.

Further, according to the speed changing mechanism M, the respective thrust bearings 71 through 76 are arranged respectively between the reaction force member 56 and the end of sun gear shaft 16, between the drum 54 and the sun gear $S_2$, between the sun gear $S_2$ and the carrier $C_1$, between the sun gear $S_1$ and the flange of the carrier $C_1$, between the flange of the carrier $C_1$ and the sun gear $S_3$, and between the sun gear $S_3$ and the flange of the carrier $C_3$. Further, the output gear 19 is supported by a center support 10c via bearings 24 and 25 capable of supporting the thrust force, such as tapered roller bearings or angular ball bearings.

Further, to transmit the axial force from the input clutch C-2 to the end wall 10a, the race 57a of the bearing 57 for transmitting the axial force to the end wall is fixed between the reaction force member 56 and the end wall 10a.

The output gear 19 which comprises a helical gear having teeth twisted with respect to the axial line and a direction of the thrust force caused in the driving operation by the helical gear in mesh with a gear of the counter gear device 21, that comprises a similar helical gear, is set to the direction opposed to the axial force in engaging the input clutch C-1 (in the left direction of the drawing).

Therefore, according to the speed changing mechanism, the servo force from the piston 31 of the hydraulic servo 3 is transmitted to the reaction force member 56 via the bearing 32, the pressing member 33 and the friction coupling elements 50 and is transmitted from the reaction force member 56 to the center support 10c via the bearing 71, the sun gear shaft 16 and the sun gear $S_1$, the bearing 74, the flange of the carrier $C_1$, the bearing 75, the sun gear $S_3$, the bearing 76, the flange of the carrier $C_3$, the output gear 19 and the bearings 24 and 25. Further, the hydraulic reaction force in a direction opposed to the servo force of the piston 31 operates on the end wall 10a of the casing on the side where the hydraulic servo 3 is installed. As a result, the servo force of the piston 31 and the hydraulic force in the opposite direction cancel each other by being transmitted to the end walls 10a, 10b of the casing 10 of the speed changing mechanism. Further, in FIG. 5, the blackened portion applied on the notation showing each bearing represents that the servo force is transmitted.

Meanwhile, with respect to the hydraulic servo 4, the servo force from the piston 41 is transmitted to the reaction force members 66 via the bearing 42, the pressing member 43 and the friction coupling elements 60 and further, transmitted to the end wall 10a of the casing via the input shaft 14, the bearing race 57a and the bearing 57. Also in this case, the hydraulic reaction force in a direction opposed to the servo force of the piston 41 is operated on the end wall 10b of the casing where the hydraulic servo 4 is installed. As a result, the servo force of the piston 41 and the hydraulic force in the opposed direction cancel each other by being transmitted to the end walls 10a, 10b of the casing 10 of the speed changing mechanism.

Further, according to the example, the reaction force member 66 on the side of the input C-2 is connected to the input shaft 14 and therefore, the thrust force of the speed changing mechanism M is not received via the respective speed changing stages. With respect to the reaction force member 56 on the side of the input shaft C-1, the thrust force from the output gear 19 comprising the helical gear is transmitted by following reversely the passage of transmitting the servo force in achieving the second, the fourth and the fifth speeds where the input clutch C-2 is brought into the engaged state. In these cases, a distance between the reaction force member 56 and the pressing member 33 in releasing the clutch, that is, the clearances of the friction coupling elements 50 and the positional relationship of the piston 31 in respect thereto, are maintained constant irrespective of the movement of the reaction force member 56 in a direction toward the end wall 10a. Accordingly, in this example, there is provided an advantage of being capable of reducing speed changing shock by preventing deterioration of the controllability of the clutches (C-1, C-2) caused by a variation in clearances.

Although an explanation has been given of the invention based on the embodiment and examples applied to a speed changing mechanism as described above, the invention is applicable to devices in a wide variety by modifying variously specific structures within a range of items described in the scope of claims. For example, the regulating means may be means of directly regulating the interval between the pressing member and the reaction force member, specifically a structure where the back of the pressing member is brought into contact and stopped by a snap ring fitted to the side of a spline of the hub or the drum or may be a structure where the retainer is caught and stopped directly by the reaction force member even in the case where the means regulates retraction of a return spring.

What is claimed is:

1. A stationary cylinder clutch device, comprising:

a hub providing an input member;

a drum providing an output member;

a friction coupling element comprising a first set of plates connected to an outer periphery of the hub and a second set of plates connected to an inner periphery of the drum, the first set of plates and the second set of plates capable of transmitting a rotational power, the first set of plates and the second set of plates assembled to alternate plates;

a pressing member positioned on one side of the friction coupling element in an axial direction;

a reaction force member on an opposite side of the friction coupling element in the axial direction, the friction coupling element mounted between the pressing member and the reaction force member;

a hydraulic servo installed at a fixed member producing a servo force that is transmitted to the friction coupling element via the pressing member to engage the friction coupling element between the pressing member and the reaction force member and a reaction force caused by engaging the friction coupling element is supported by the fixed member via the reaction force member;

at least one return spring arranged between the pressing member and the reaction force member for pushing the pressing member and the reaction member in a direction for separating the pressing member and the reaction force member; and a regulating means for restricting an amount of separation between the pressing member and the reaction force member to a predetermined value wherein the hydraulic servo is provided with a piston for applying the servo force to the pressing member and loading means for preventing the piston from separating from the pressing member by always pushing the piston to the pressing member.

2. The stationary cylinder type clutch device according to claim 1, wherein the regulating means is a stopper for regulating an amount of expansion of the at least one return spring.

3. The stationary cylinder clutch device according to claim 2, wherein the at least one return spring is arranged at an inner side of the hub in a radial direction and the pressing member is provided with a retainer at one end of the at least one return spring, and the stopper is a snap ring fixed to a side of an inner periphery of the hub to engage the retainer.

4. The stationary cylinder clutch device according to claim 1, wherein the loading means is a belleville spring arranged in the hydraulic servo and is provided with an applied load smaller than an applied load of the at least one return spring.

5. The stationary cylinder clutch device according to claim 1, wherein the loading means is a hydraulic pressure supplied into the hydraulic servo such that the servo force is provived having an applied load smaller than the applied load of the return spring.

6. The stationary cylinder clutch device according to claim 2, wherein the hydraulic servo is provided with a piston for applying the servo force to the pressing member and loading means for preventing the piston from floating from the pressing member by always pushing the piston to the pressing member.

7. The stationary cylinder clutch according to claim 1, wherein the at least one return spring is arranged at an inner side of the hub in a radial direction and the pressing member is provided with a retainer at one end of the at least one return spring, and the stopper is a snap ring fixed to a side of an inner periphery of the hub to engage the retainer.

8. The stationary cylinder clutch device according to claim 3, wherein the loading means is a belleville spring arranged in the hydraulic servo and is provided with an applied load smaller than an applied load of the at least one return spring.

9. The stationary cylinder clutch device according to claim 3, wherein the loading means is a hydraulic pressure supplied into the hydraulic servo such that the servo force is provided having an applied load smaller than the applied load of the at least one return spring.

10. A clutch device, comprising:

an annular reaction force member;

a hub mounted to the reaction force member, the reaction force member and the hub comprising an input member of the clutch device;

an annular drum forming an output member;

a plurality of friction coupling elements for transmitting rotation of the input member to the output member;

a pressure applying mechanism for pressing the plurality of friction coupling elements together;

a casing having an annular well for receiving the pressure applying mechanism;

first force applying means for separating the reaction force member and the pressure applying mechanism;

second force applying means mounted in the annular well for eliminating play in the pressure applying mechanism; and a stopper mounted to a radially inner surface of the hub for limiting the separation of the reaction force member and the pressure applying mechanism caused by the first force applying means.

11. The clutch device according to claim 10, wherein the plurality of friction coupling elements comprises a set of separator plates and a set of friction disks assembled to alternate a separator plate and a friction disk.

12. The clutch device according to claim 11, wherein the set of friction disks are non-rotationally attached to the drum but axially movable therealong and the separator plates are non-rotationally mounted to the hub but axially slidable therealong.

13. The clutch device according to claim 10, wherein the pressure applying mechanism comprises:

an annular pressing member opposing the reaction force member;

an annular piston sealingly but slidably mounted in the annular well of the casing; and an annular thrust bearing between and separating the pressing member and the piston.

14. The clutch device according to claim 13, wherein the first force applying means is a plurality of springs interposed between the input member and the pressing member.

15. The clutch device according to claim 14, wherein the second force applying member is a belleville spring, the force applied by the plurality of springs greater than the force applied by the belleville spring.

16. The clutch device according to claim 14, further comprising a plurality of spring retainers, a spring retainer for each spring, the plurality of spring retainers mounted to the pressing member.

17. The clutch device according to claim 16, wherein each spring retainer has a regulating portion for engaging the stopper.

18. The clutch device according to claim 17, wherein the stopper is a snap ring, the radially inner surface of the hub having a groove and the snap ring received in the groove.

* * * * *